(12) United States Patent
Homann et al.

(10) Patent No.: US 7,198,477 B2
(45) Date of Patent: Apr. 3, 2007

(54) MECHANICAL SHUT-OFF VALVE FOR GAS-ASSIST INJECTION MOLDING

(75) Inventors: Gregory A. Homann, Canton, MI (US); Michael W. Gaudiello, Temperance, MI (US)

(73) Assignee: Lear Corporation, Southfield, MI (US)

( * ) Notice: Subject to any disclaimer, the term of this patent is extended or adjusted under 35 U.S.C. 154(b) by 264 days.

(21) Appl. No.: 10/707,613

(22) Filed: Dec. 24, 2003

(65) Prior Publication Data

US 2005/0142246 A1    Jun. 30, 2005

(51) Int. Cl.
*B29C 45/23* (2006.01)
(52) U.S. Cl. .................. 425/130; 425/564; 425/566
(58) Field of Classification Search ............... 425/562, 425/563, 564, 565, 566, 130
See application file for complete search history.

(56) References Cited

U.S. PATENT DOCUMENTS

| | | | |
|---|---|---|---|
| 4,681,528 A * | 7/1987 | Maruyama et al. ......... 425/562 |
| 5,012,839 A * | 5/1991 | Rogers et al. ............ 425/563 |
| 5,013,513 A | 5/1991 | Schad |
| 5,149,546 A | 9/1992 | Nelson |
| 5,164,200 A | 11/1992 | Johnson |
| 5,256,047 A | 10/1993 | Moldovanyi |
| 5,273,417 A | 12/1993 | Nelson |
| 5,304,341 A | 4/1994 | Shah |
| 5,466,141 A | 11/1995 | Eckardt |
| 5,639,405 A | 6/1997 | Erikson |
| 5,711,344 A | 1/1998 | Mullally |
| 5,770,237 A | 6/1998 | Sayer |
| 5,843,485 A | 12/1998 | Fernandez |
| 6,099,284 A | 8/2000 | Hardgrove |
| 6,250,903 B1 | 6/2001 | Fernandez |

* cited by examiner

*Primary Examiner*—Tim Heitbrink
(74) *Attorney, Agent, or Firm*—Earl LaFontaine, Esq.; Artz & Artz, P.C.

(57) ABSTRACT

A mechanical shut-off valve member for use with gas-assisted injection molding systems. A piston member is slidingly positioned in a body member or housing and spring-biased to a closed position. The valve member is opened by the injection of plastic material through the valve member and into a mold cavity. The spring biasing force closes the valve member and shuts off the flow of plastic once the mold cavity is filled with the requisite amount of plastic material. The shut-off valve member prevents any backflow of plastic material into the nozzle or injection molding machine during further steps in the injection molding process, including injection of gas or fluid into the plastic in the mold cavity.

12 Claims, 2 Drawing Sheets

MECHANICAL SHUT-OFF VALVE FOR GAS-ASSIST INJECTION MOLDING

BACKGROUND OF INVENTION

The present invention relates to apparatus and systems for gas-assist injection molding and more particularly to shut-off valves for gas-assist injection molding systems.

There are many processes and techniques today for gas-assisted injection molding. Gas-assisted injection molding processes have added flexibility to the design and manufacture of plastic parts with their ability to produce partially hollow, light-weight, rigid parts with minimal sink marks and less tendency to warp. These processes can reduce material requirements, as well as equipment costs and cycle time, and thus have advantages over conventional injection molding processes and techniques in many applications.

In general, gas-assisted injection molding systems utilize a fluid or gas, such as nitrogen, under pressure to expand the plastic material in the mold and conform it to the mold cavity details. The fluid or gas can be introduced into the mold in several way, such as through a bushing, nozzle, or machine nozzle into one or more cavities, or at one or more locations.

In typical operation, a "shot" or quantity of plastic material is injected into the mold cavity, then pressurized gas is introduced which causes the plastic to expand against the walls of the cavity. The gas pressure is maintained until the plastic material has cooled sufficiently to be self-supporting, whereupon the gas is vented, the mold is opened, and the plastic article is removed and/or ejected from the mold cavity.

With gas-assisted injection molding techniques, care must be taken to prevent the pressurized gas that is injected into the mold cavity from being directed into the bushing, runner system, or plastic injection machine.

Typically, a shut-off valve of some type is positioned in the machine nozzle or adjacent the machine nozzle in order to positively shut off the flow of plastic into the mold cavity and at the same time prevent back flow of plastic and/or gas into the plastic injection molding system. Known systems, however, typically require an external power source and a complicated power system, such as hydraulic, pneumatic, or electrical system with various electronic or mechanical controls. These systems are typically complex and expensive and require additional setup and programming time and expense.

SUMMARY OF INVENTION

It is an object of the present invention to provide an improved system and apparatus for gas-assisted injection molding. It is also an object of the present invention to provide an improved gas-assisted shut-off mechanism which allows the introduction of plastic material into the mold cavity, but prevents the backflow of plastic or pressurized gas into the plastic injection molding machine.

It is another object of the present invention to provide an improved shut-off valve member for use with a gas-assisted injection molding process. It is a further object of the present invention to provide a mechanical shut-off valve for gas-assisted injection molding processes which allows the injection of plastic through the valve but prevents the entry of plastic or gas back into the injection molding machine.

The present invention overcomes prior difficulties with shutoff and valve-gate type bushings or nozzles used with gas-assisted plastic injection molding systems and fulfills the objects and purposes noted above.

The present invention provides a mechanical-type shut-off valve which prevents backflow of molten plastic material into the injection unit of the injection molding machine and also prevents backflow of pressurized gas or liquid which is injected into the plastic material in the mold cavity. The device is typically integrated into the mold or tooling and includes an outside body member or housing and a spring-biased piston member. The piston member is biased relative to the body member or housing by a coil spring or the like. In the closed position, the piston member is forced against the plastic injection passageway or channel, primarily by the force of the biasing member. In the open position, the force of the plastic and pressure from the injection molding machine collapses the biasing member and allows plastic to flow through and around the piston member and into the mold cavity.

When the plastic injection process is complete, the biasing member returns the piston member to its closed position which prevents back-flow of plastic material into the injection molding machine or system. Also, the pressure caused by the injection of pressurized gas into the mold cavity provides a positive seal against return of any of the plastic or gas into the plastic injection molding system.

Preferably, one or more heater members are included in or on the body member or housing in order to keep the plastic material in the body member or housing in a fluid condition at all times.

These and other features, purposes, benefits and advantages of the present invention will become apparent from the following detailed description of the invention when taken together in view of the accompanying drawings and appended claims.

DETAILED DESCRIPTION

Figure 1:
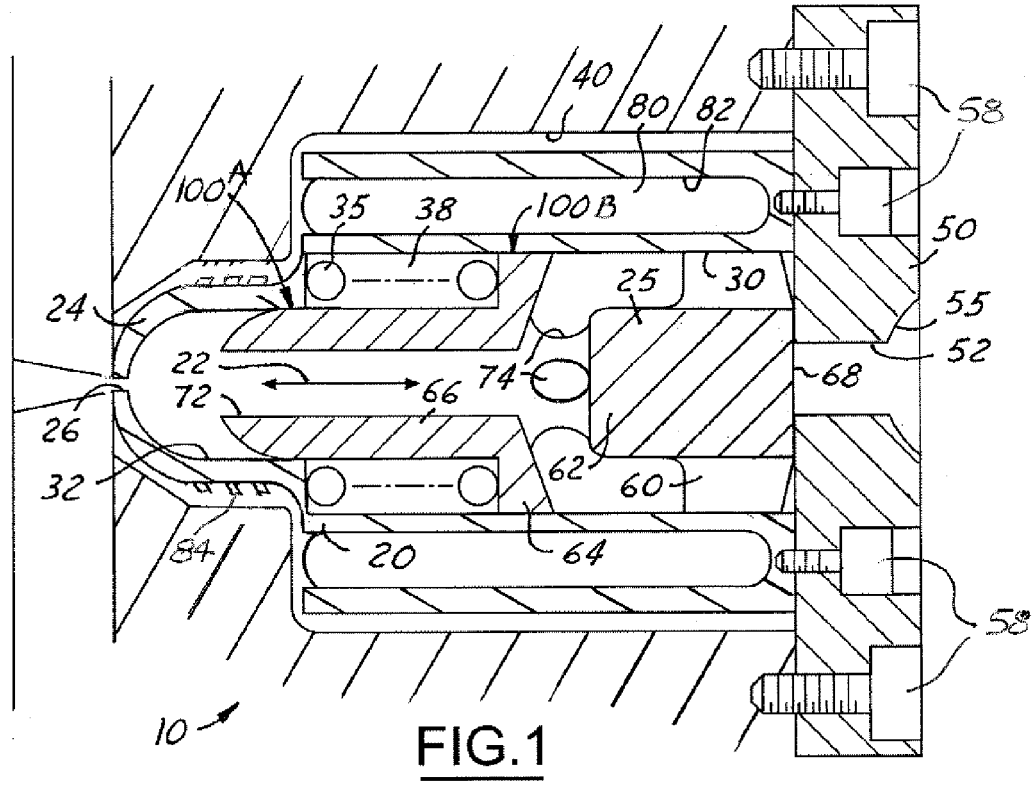
FIG. 1 illustrates a shut-off valve in the closed position in accordance with an embodiment of the present invention.
Figure 2:
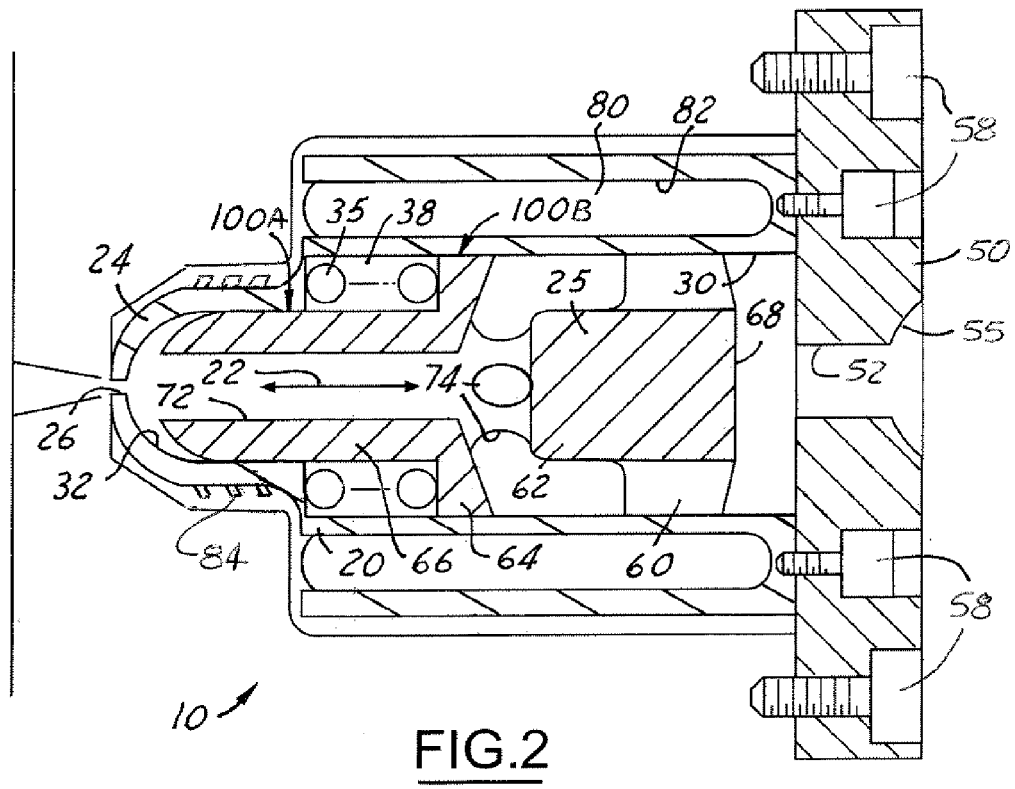
FIG. 2 illustrates a shut-off valve in an open position in accordance with an embodiment of the present invention.

FIGS. 1 and 2 illustrate an embodiment of the present invention and shows its use in a typical injection molding environment. The present invention is particularly adapted to be used in a gas-assisted injection molding process or system. In this regard, the use of the term "gas" through-out this document is not meant to be limiting. The invention can be used with fluids of all types, whether in the gaseous or liquid states.

Also, the present invention can be used with bushings or nozzles of all types for gas-assisted injection molding systems, including sprue bushings and machine nozzles. In fact, with other embodiments of the present invention, it is possible to include the present invention in a machine nozzle or other structure.

The shut-off valve member is generally referred to by the reference numeral 10 in the drawings. The valve member 10 includes a body or housing member 20 and centrally located a piston member 25. The piston member 25 is slidingly positioned in a cavity 30 in the body member 20 and is biased to the position shown in FIG. 1 by a biasing member 35. In this regard, the biasing member can be of any type, which provides a sufficient biasing and return force necessary for the present invention to successfully operate as described below. Preferably, the biasing member is a spring member, such as a coil spring member.

The valve member 10 is typically positioned in a cavity 40 in a mold 45. This is shown in FIG. 1. A retainer plate member 50 is used with the valve member 10 in order to hold the valve member securely in position in the mold. In this regard, as shown in FIGS. 1 and 2, the plate member 50 is fixedly secured to the valve member 10 and the mold member 45 with a plurality of fasteners, such as screws or machine bolts 58.

It is to be understood, of course, that the valve member can be secured in a mold in any conventional manner.

The piston member 25 is adapted to move or reciprocate in the body member 20 in a direction of the arrow 22. In this regard, the shut-off valve member 20 is shown in its closed position in FIG. 1 which prevents the flow of plastic material through it and in its open position in FIG. 2 which allows the flow of plastic material through it.

It is also understood that the present invention can be utilized by itself, in a mold, or used in combination with a manifold member (not shown), a hot runner system (not shown), or the like. Also, as shown in FIGS. 1 and 2, the retainer plate member 50 has a spherical-shaped recess or mounting cavity 55 for the end of a machine nozzle of an injection molding machine. It is to be understood, of course, that other arrangements can be used to position or attach the injection molding machine operationally to the shut-off valve member 10.

Figure 3:
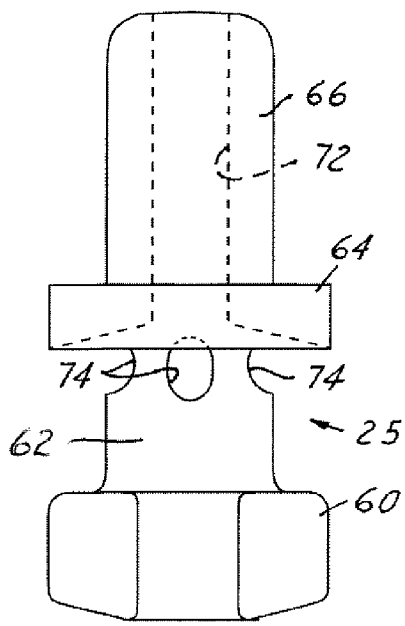
FIG. 3 illustrates a piston member used with the embodiment of the invention as set forth in FIGS. 1 and 2.
Figure 4:
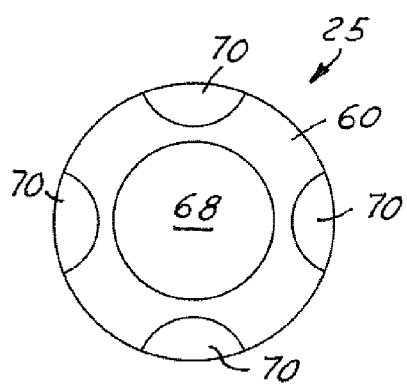
FIG. 4 is an end view of the piston member depicted in FIG. 3.

Further details of the piston member 25 are shown in FIGS. 3 and 4. In particular, the piston member includes a head member 60 at one end, a central shank member 62 in the middle, a flange member 64, and a hollow shank member 66 at the other end. The head member 60 includes a flat or planar member 68 which is used to seal off the end of passageway 52 in the plate member 50 when the valve member 10 is in its closed position as shown in FIG. 1. In this manner, the member 68 comprises a first valve member which mates with the surface of the retainer plastic member which forms a second valve member. As understood by persons skilled in the art, the first and second valve members can have any conventional valve shape and configuration so long as they mate or join together in a valve-type relationship which can prevent the flow of plastic material.

The head of the piston member also includes a plurality of grooves or channels 70 arranged around its periphery. These allow plastic material from the injection molding machine to pass around the head member 60 when the piston member is positioned in the body member 20 and in the position shown in FIG. 2. Although four grooves or channel members 70 are shown in FIG. 4, it is understood that other numbers could be utilized, and the invention is not limited to any particular number.

A hollow passageway or channel member 72 is provided in the forward shank member 66 of the piston member 25. A plurality of openings 74 provide access to the passageway 72 for the plastic material from the injection molding machine.

The flange member 64 is used to support one end of the biasing (spring) member 35.

The piston member 25 is provided to slidingly fit within the cavity 30 in the body member 20. For this purpose, the outer dimensions of the head member 60, flange member 64, and forward shank member 66 are provided to slidingly fit within the main cavity 30 of the body member, as well as the forward cavity 32. In this regard, the close tolerances between the outer surface of the forward shank member 66 and the walls of the forward cavity 32, as well as the outer diameter surfaces of the flange member 64 and the walls of the main cavity 30, are preferred in order to prevent plastic material from entering into the cavity 38 where the biasing member 35 is positioned. In this regard, seal members can be provided either in the body member or the piston member at the locations marked 100A and 100B in FIGS. 1 and 2 in order to help insure that plastic material does not enter the spring cavity 38.

The forward end 24 of the body member 20 has an opening or orifice 26 through which plastic material is injected or discharged into a mold cavity (not shown).

Heater member 80 is preferably positioned in an annular space 82 in the body member 20. The heater member, which preferably is a resistance-type heater, such as a coil heater or band heater of any conventional type, is electrified by being connected to an appropriate power source (not shown). The heater member is used to keep the plastic material in the valve member 10 in a fluid condition during the injection molding process. The heater member can be positioned internally or externally relative to the body member 20. Another heater member 84 can be provided around the forward end 24 of the body member.

The body member and piston member can also have any convenient or conventional shape or cross-section. The body member can also be of a type which is threadedly secured to a mold or manifold. All of these types of bushings, heater members, and other structures are know in the art.

In a gas-assisted plastic injection molding process, the plastic material is initially melted and converted into a molten state in the barrel of an injection molding machine (not shown). The plastic material is then forced into and through the valve member 10, or, if a manifold is used, into and through the manifold and then into and through the valve member 10. In this regard, heaters in the manifold keep the plastic material in the manifold passageways in a molten condition, and the heater members on the valve member 10 maintains the plastic material in the valve member passageways in a molten condition. In this manner, after the injection cycle injects a quantity of plastic material into the mold cavity, the remaining plastic material in the valve member and manifold will not harden or solidify but is retained in a liquid or molten condition ready for the next injection cycle.

When the valve member 10 as shown in FIG. 1 is used, the piston member 25 is initially positioned in its closed position as shown in FIG. 1. In this position, the spring member 35 provides a biasing force on the flange member 64 forcing the first valve member (flat surface area 68) of the head member 60 tightly against the second valve member (plate member 50) or other fixture. This prevents plastic material from entering the valve member 10 and mold cavity through passageway 52.

After the mold is closed, the plastic injection process is initiated. The force of the plastic material and pressure from the injection molding machine forces the piston member 25 from the closed position shown in FIG. 1 to the open position shown in FIG. 2. In this position, the piston member 25 is forced against the biasing force of the spring member 35, thereby collapsing or compressing the spring member as shown in FIG. 2. This allows plastic to flow through the grooves 70, opening 74, passageway 72, and orifice 26 into the mold cavity.

In this regard, the amount of plastic material interjected into the mold cavity is dependent upon the particular process utilized. For example, the quantity of plastic can be less than an amount to fill the entire mold cavity (a "short shot"), or sufficient to completely fill the mold cavity (a "full shot"). In addition, the plastic material can be packed in the mold cavity by the subsequent step of forcing more plastic material at a higher pressure through the valve member 10 and into the mold cavity.

Once the mold is filled to its desired extent of volume required for the application, the injection of plastic material is ceased. At this point, the screw rotation of the injection molding machines starts and the spring tension from spring member 35 forces the piston member 25 to its closed position as shown in FIG. 1. In this regard, it is necessary that the biasing force in the spring member 35 be sufficient to overcome the hydraulic back pressure which is typically caused by the pressure of the screw rotation.

In accordance with conventional gas-assisted injection molding processes, a gas or fluid is then introduced at a high pressure into the mold cavity. This pushes or forces the plastic material in the mold cavity into all areas of the mold, completing the filling of the cavity. In this regard, the present invention is adapted to be utilized with any type of gas/fluid-assisted injection molding process or system known or in use today.

Also, in accordance with standard gas-assisted injection molding techniques, after the requisite amount of gas and plastic are injected into the mold, the pressure of the gas is typically maintained to compensate for any volumetric shrinkage of the plastic as it cools and solidifies.

Once the plastic injection ceases and the gas injection begins, the pressure in the mold cavity increases. However, due to the structure and configuration of the valve member 10, a backflow of plastic material and/or gas into the plastic injection molding nozzle and machine is prevented. Any pressure from the mold cavity exerted back into the valve member 10 through the orifice 26, whether from the plastic material or the gas/fluid material, adds additional closing pressure of the valve member. As a result, any pressure from the mold cavity into the mold member 10 only assists in helping the biasing member maintain the piston member 25 in its closed position.

Once the plastic and gas injection processes are complete, the plastic material in the mold cavity is allowed to cool and solidify. In this regard, the mold members are typically cooled by circulation of a coolant through appropriate channels or passageways (not shown) in the mold which assist in cooling and solidifying the plastic material.

Once the plastic article in the mold cavity is sufficiently solidified, the gas within the molded part is vented to atmosphere and the part is removed from the mold cavity. In this regard, typically one or more ejector pins are utilized to assist in the removal of the molded plastic article from the mold cavity. The solidifying, cooling, venting, and removal procedures can be any of those conventionally or typically utilized in the injection molding field today. For example, the gas can be vented back through the gas injection member or through a separate vent member positioned in the mold cavity.

The gas which is utilized with the present invention is preferably nitrogen, but it can be any other conventional gas or fluid utilized with other gas-assisted injection molding processes. Also, if desired, the gas being removed or vented from the mold after the molded cycle, can be collected, reclaimed and reused.

Although in the preferred embodiment of the invention, the unique valve member is inserted in a mold member and controls the passage of plastic material into the mold cavity from either a machine nozzle or manifold, the invention can also be used as part of a multiple or stacked bushing system. For example, a conventional bushing, such as a heated bushing, can be interposed or positioned between the inventive valve member 10 and the mold cavity.

Figure 5:
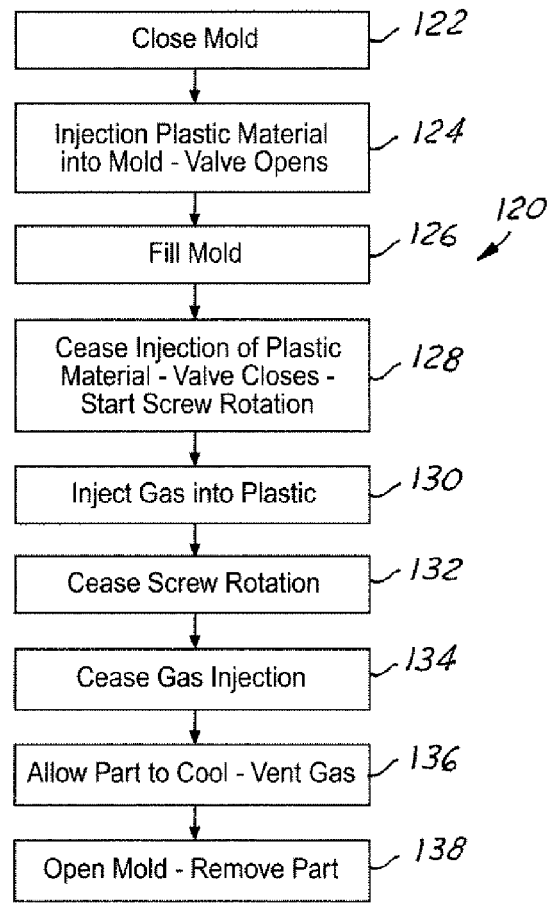
FIG. 5 is a flow diagram illustrating the basic steps in the method for use with an embodiment of the present invention.

FIG. 5 is a flow diagram depicting the basic steps in the gas-assisted injection molding process with which the present invention can be utilized. The process is referred to generally by the reference numeral 120 and includes a series of steps or boxes. As a first step, as shown in Box 122, the mold is closed. Thereafter, plastic material is injected into the mold cavity. This is shown in Box 124. At this point, the plastic flow and pressure at the machine nozzle forces the piston member 25 toward the orifice 26, which compresses the spring member 35 and allows molten plastic to flow through the cavity members 30 and 32 in the body member 20 and into the mold cavity.

The plastic material is continued to be injected into the mold cavity until the desired extent of volume of plastic material required for the application is injected. This is shown in Box 126.

Once the required amount or quantity of plastic material is injected into the mold cavity, the injection forward ends and the rotation of the screw of the injection molding machine begins. This is shown in Box 128. The biasing force of the spring member 35 forces the piston member 25 to the rearward position as shown in FIG. 1 providing shut-off. As indicated above, the force of the spring tension must be sufficient to overcome any hydraulic pressure caused by rotation of the screw of the injection molding machine.

Thereafter, the injection of the gas or fluid into the mold cavity is initiated. This is shown in Box 130. The injection of the gas or fluid increases the internal cavity pressure in the mold cavity. That increased pressure, as well as the biasing force of the spring member 35 maintain the valve member 10 in the closed position as shown in FIG. 1. This prevents any backflow of plastic material into the nozzle or injection molding machine. The rotation of the screw in the injection molding machine stops typically at a metering set point. This is shown in Box 132. Also, the injection of the gas into the mold cavity ceases. This is shown in Box 134.

At this point, the plastic material in the mold cavity is allowed to cool and solidify. This is shown in Box 136. Once the plastic part or article has cooled sufficiently to be self-supporting, the gas in the internal or hollow cavity is vented to atmosphere.

Finally, as shown in Box 138, the mold is opened and the molded plastic article or part is removed. In this regard, the plastic molded article is typically ejected from the mold cavity by one or more ejector pins (not shown).

With the present invention, the complexity and cost of associated tooling, as well as process and peripheral equipment for gas-assist injection molding operations in applications, is reduced. The use of internal power sources or control systems or input are not required. Also, the present invention reduces the labor and manufacturing cost and time since there is less set up time and processing for installation and setup of the injection molding system.

Also, the spring is isolated from the resin flow path so that the valve member can have minimal effect on color changes.

The foregoing discussion discloses and describes an exemplary embodiment of the present invention. Persons skilled in the art will readily recognize from such discussion and from the accompanying drawing and claims, that various changes, modifications and variations may be made therein without departing from the spirit and scope of the invention as defined by the following claims.

The invention claimed is:

1. A shut-off valve assembly for a plastic injection molding system, said assembly comprising:
    a housing member having an internal cavity, an orifice at a first end of said cavity, and an opening at the second end of said cavity;
    a piston member slidingly positioned in said cavity, said piston member having an internal passageway therein for at least part of its length for passage of plastic material, said passageway having a first opening in the direction of said orifice at the first end of the cavity and at least one second opening distal to said orifice;
    said piston member having a head member at one end positioned adjacent said second end of said cavity;
    a plate member attached to said housing member and having an opening positioned for passage of plastic material into said opening in the second end of said cavity; and
    a biasing member positioned in said cavity and biasing said piston member in a direction toward said second end of said cavity;
    wherein said piston member has a first position biased by said biasing member with said head member in contact with said plate member for preventing passage of plastic material through said opening in said plate member, and a second position forced away from said plate member by pressure of the injected plastic material to allow passage of plastic material through said opening in said plate member.

2. The assembly as described in claim 1 wherein said biasing member is a spring member.

3. The assembly as described in claim 2 wherein said spring member is a coil spring member.

4. The assembly as described in claim 1 further comprising at least one heater member positioned on said housing member.

5. The assembly as set forth in claim 1 further comprising a flange member on said piston member, said flange member contacting said biasing member.

6. The system as set forth in claim 1 wherein said head member has a first surface for mating with said opening in said plate member and preventing passage of plastic material through said opening.

7. An integrated mechanical shutoff valve system for use in plastic injection molding, said system comprising;
    a mold member having at least a first mold cavity therein;
    a shutoff valve assembly comprising:
    a housing member having an internal cavity, an orifice at a first end of said cavity, and an opening at the second end of said cavity;
    a piston member slidingly positioned in said cavity, said piston member having an internal passageway therein for at least part of its length for passage of plastic material, said passageway having a first opening in the direction of said orifice at the first end of the cavity and at least one second opening distal to said orifice;
    said piston member having a head member at one end positioned adjacent said second end of said cavity;
    a plate member attached to said housing member and having an opening positioned for passage of plastic material into said opening in the second end of said cavity; and
    a biasing member positioned in said cavity and biasing said piston member in a direction toward said second end of said cavity;
    wherein said piston member has a first position biased by said biasing member wit said head member in contact wit said plate member for preventing passage of plastic material through said opening in said plate member, and a second position forced away from said plate member by pressure of the injected plastic material to allow passage of plastic material through said opening in said plate member;
    said orifice at said first end of said cavity allowing passage of plastic material into said mold cavity.

8. The system as set forth in claim 7 wherein the assembly as described in wherein said biasing member is a spring member.

9. The system as set forth in claim 8 wherein said spring member is a coil housing member.

10. The system as set forth in claim 7 further comprising at least one heater member positioned on said housing member.

11. The system as set forth in claim 7 further comprising a flange member on said piston member, said flange member contacting said biasing member.

12. The system as set forth in claim 7 wherein said head member has a first surface for mating with said opening in said plate member and preventing passage of plastic material through said opening.

* * * * *

UNITED STATES PATENT AND TRADEMARK OFFICE
CERTIFICATE OF CORRECTION

| | | |
|---|---|---|
| PATENT NO. | : 7,198,477 B2 | Page 1 of 1 |
| APPLICATION NO. | : 10/707613 | |
| DATED | : April 3, 2007 | |
| INVENTOR(S) | : Gregory A. Homann and Michael W. Gaudiello | |

It is certified that error appears in the above-identified patent and that said Letters Patent is hereby corrected as shown below:

Column 8, line 25 should read as follows: --said biasing member with said head member in contact--

Column 8, line 26 should read as follows: --with said plate member for preventing passage of plastic--

Signed and Sealed this

Third Day of July, 2007

JON W. DUDAS
*Director of the United States Patent and Trademark Office*